United States Patent
Fang et al.

(10) Patent No.: US 8,755,291 B2
(45) Date of Patent: Jun. 17, 2014

(54) NETWORK INTERFACE APPARATUS WITH POWER MANAGEMENT AND POWER SAVING METHOD THEREOF

(75) Inventors: Lie-Way Fang, Taichung County (TW); Shieh-Hsing Kuo, Hsinchu (TW); Chia-Ying Chiu, Taoyuan County (TW); Mei-chao Yeh, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 991 days.

(21) Appl. No.: 12/648,993

(22) Filed: Dec. 29, 2009

(65) Prior Publication Data
US 2010/0165865 A1 Jul. 1, 2010

(30) Foreign Application Priority Data
Dec. 31, 2008 (TW) ................. 97151533 A

(51) Int. Cl.
*H04L 12/66* (2006.01)
(52) U.S. Cl.
USPC .......................................... 370/252; 370/463
(58) Field of Classification Search
USPC .................. 370/252, 351, 359, 362, 463
See application file for complete search history.

(56) References Cited

U.S. PATENT DOCUMENTS

| | | | |
|---|---|---|---|
| 3,174,103 A * | 3/1965 | Monroe | ........................... 455/95 |
| 6,463,542 B1 | 10/2002 | Yu et al. | |
| 6,952,784 B1 | 10/2005 | Miller | |
| 7,352,755 B2 | 4/2008 | Cranford, Jr. et al. | |
| 2005/0086393 A1* | 4/2005 | Meng et al. | ....................... 710/1 |

* cited by examiner

*Primary Examiner* — Yemane Mesfin
*Assistant Examiner* — Mon Cheri Davenport
(74) *Attorney, Agent, or Firm* — McClure, Qualey & Rodack, LLP

(57) ABSTRACT

Network interface apparatus with power management is disclosed, which comprises a physical layer circuit, for receiving a packet on a network; a media access control circuit, for performing the media access processing on the packet to output a processed packet; an interface circuit, coupled to the media access control layer, for transmitting the processed packet to a bus; a detecting circuit, coupled to the physical layer circuit, for detecting a transmitting status of the packet on the network to output a detecting signal; a loading control circuit, coupled to the detecting circuit, for controlling a load positioned in the interface circuit according to the detecting signal.

16 Claims, 3 Drawing Sheets

NETWORK INTERFACE APPARATUS WITH POWER MANAGEMENT AND POWER SAVING METHOD THEREOF

FIELD OF THE INVENTION

The present invention relates generally to a network interface apparatus, and particularly to a network interface apparatus with power management.

BACKGROUND OF THE INVENTION

Most computer systems have a built in a network interface apparatus (or network interface adapter) so as to link with internet. In general, the network interface apparatus is not transmitting packet at any time, even it could be a long time without transmitting any packet. Therefore, the network interface apparatus may have some power consumption modes can be selected to achieve the purpose of power saving. For example, the network interface apparatus can be set into power saving mode to save power when operating at non-link status or no packet transmitted.

It is necessary that the network interface apparatus informs the upper level circuit (for example: operating system, basic input/output system or chipset) in the computer system when the network interface apparatus will be operated in power saving mode or has already operated in power saving mode, so that the system can proceed with off loading and rearranging the resource of the network interface apparatus.

For current technology, in order to inform the upper level circuit in the computer system, a General Purpose Input/Output (GPIO) pin is utilized by the network interface apparatus to communicate with the upper level circuit. However, through GPIO pin to perform communication not only the network interface apparatus need another pin but also the upper level circuit. Thus, this approach will waste chip area, and additional wiring on the printed circuit board (PCB) is unavoidable as well.

SUMMARY

An objective of the present invention is to provide a network interface apparatus with power management, which no need extra GPIO pin to communicate with upper level circuit.

Another objective of the present invention is to provide a network interface apparatus communicating with upper level circuit through changing electrical charge time constant.

This invention discloses a network interface apparatus, including a physical layer circuit, for receiving a packet on a network; a media access control layer, for performing the media access processing on the packet to output a processed packet; an interface circuit, coupled to the media access control layer, for transmitting the processed packet to a bus; a detecting circuit, coupled to the physical layer circuit, for detecting a transmitting status of the packet on the network to output a detecting signal; a loading control circuit, coupled to the detecting circuit, for control a load positioned in the interface circuit according to the detecting signal.

Other features and advantages of the present invention will become apparent in the following detailed description of the preferred embodiments with reference to the accompanying drawings.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
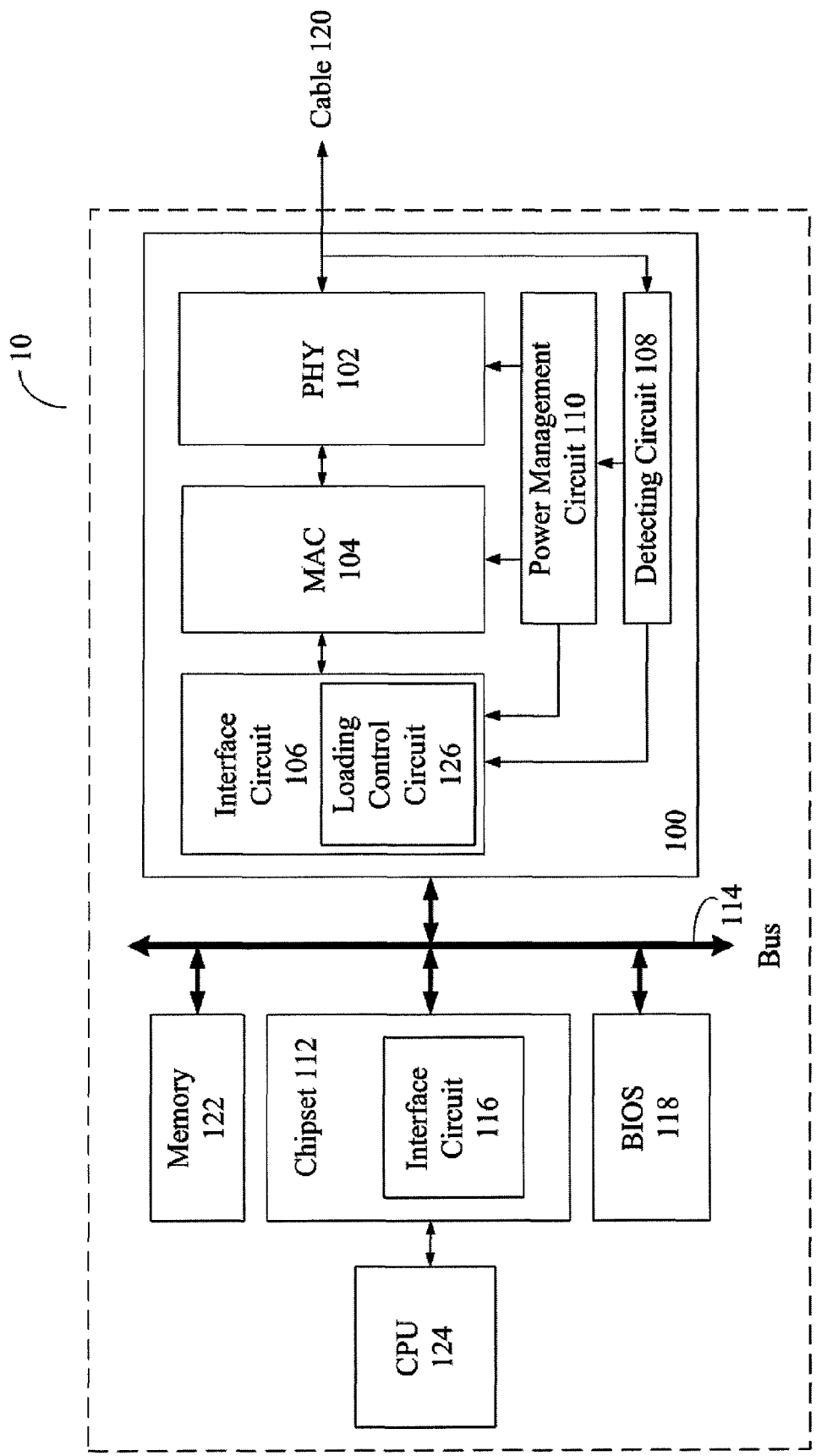
FIG. 1 shows the network interface apparatus according to one embodiment of the present invention.

FIG. 1 is a block diagram illustrating one embodiment of network interface apparatus according to the present invention. Network interface apparatus 100 is positioned in a computer system 10. As shown in FIG. 1, network interface apparatus 100 comprises a physical layer circuit 102 (PHY), media access control (MAC) 104, interface circuit 106, detecting circuit 108 and a power management circuit 110. The circuit connection is as shown in FIG. 1. In this embodiment, network interface apparatus 100 communicates with chipset 112 through PCI-E bus 114, but it is noticed that PCI-E bus 114 is not a limitation to this invention, other kind of bus can be used as well. The detail operation with regards to network interface apparatus 100 will be described in following.

First of all, when packet is transmitting on the cable 120, that is, network interface apparatus 100 operates in normal mode, physical layer circuit 102 receives the packet from network and transmits the received packet to media access control 104. Then, media access control 104 accesses and controls the packet from physical layer circuit 102 so as to transfer the packet into an appropriate packet format and transmits it to interface circuit 106. Finally, interface circuit 106 transmits the packet from media access control 104 to memory 122 for central processing unit 124 (CPU) accessing through PCI-E bus 114.

Next, when no packet transmitting on the cable 120 or the cable 120 is disconnected, detecting circuit 108 detects no link pulse on the cable 120. At this time, detecting circuit 108 will generate a detecting signal to loading control circuit 126 of interface circuit 106 to indicate that there is no packet transmitting on the cable 120 and set into power saving mode.

In this embodiment, before/after network interface apparatus 100 being set into power saving mode, loading control circuit 126 changes the loading of a load positioned in interface circuit 106 so that the interface circuit 116 of chipset 112 can detect the changing of electrical charge time constant ($\tau$) to inform central processing unit 124 that network interface apparatus 100 will operates in power saving mode (or has operated in power saving mode). When network interface apparatus 100 is set into power saving mode, some of circuits can be power down or disable for saving power. For example, power management circuit 110 can power down or disable all of circuits or part of circuits positioned in physical layer circuit 102, media access control 104 or interface circuit 106, or circuits relevant to network interface apparatus 100 positioned in chipset 112 to save power.

With regard to how interface circuit 106 changing the loading and how to detect the changing of electrical charge time constant ($\tau$), please refer to the following description.

Figure 2:
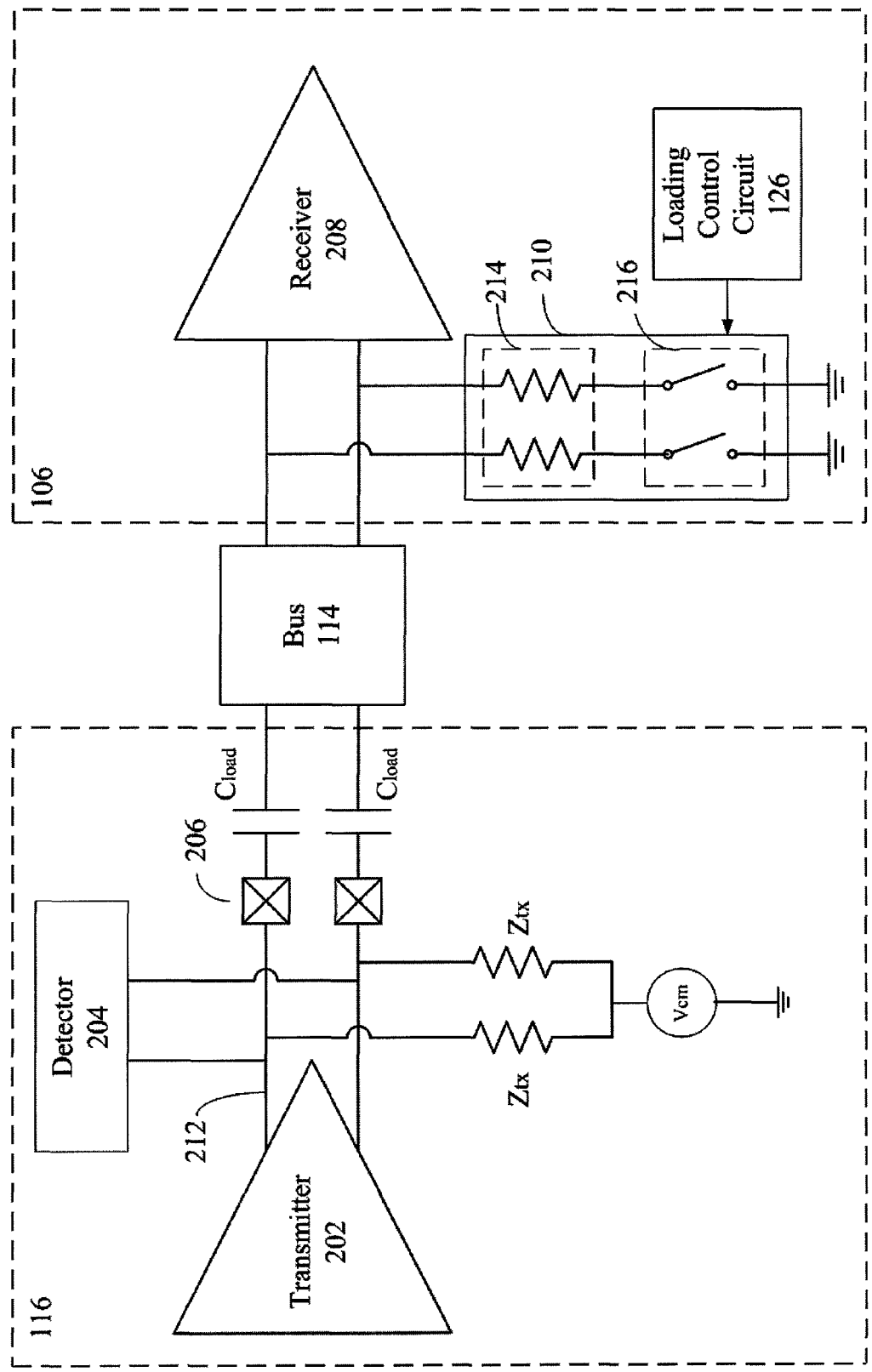
FIG. 2 shows the interface circuit positioned in the network interface apparatus according to one embodiment of the present invention.

FIG. 2 is a block diagram illustrating one embodiment of interface circuit 106 positioned in network interface apparatus 100 and interface circuit 116 positioned in chipset 112 according to present invention. interface circuit 116 comprises a transmitter 202, a detector 204 and a pad 206. interface circuit 106 comprises a receiver 208, a load 210 and a loading control circuit 126. Where load 210 is coupled between bus 114 and input of receiver 208. According to one embodiment of present invention, load 210 comprises resistor 214 and switch 216. Besides, due to the capacitance effect on pad 206 and metal line 202, symbols Cpad and Ctx are respectfully used to represent the capacitance of pad 206 and capacitance of metal line 202. In addition to said two capacitances, there is a loading capacitance Cload behind pad 206.

In one embodiment of present invention, transmitter 202 periodically transmits pulse signal to metal line 212, and interface circuit 116 determines whether network interface apparatus 100 is operating on normal mode or power saving mode by means of detector 204 detecting the electrical charge time constant ($\tau$) of metal line 212. The operation of detector 204 detecting the electrical charge time constant ($\tau$) of metal line 212 can be implemented by BIOS 118.

It is assumed that loading control circuit 126 turns on the switch 216 so that resistor 214 short to ground when packet transmitting on cable 120. At this time, the electrical charge time constant ($\tau 1$) as shown in following:

$$\tau 1 \cong Ztx \cdot (Ctx + Cpad + Cload) \quad (1)$$

Upon the equation (1), it is noticed that loading capacitance Cload is existence in the electrical charge time constant ($\tau 1$) when switch 216 is turned on.

Next, loading control circuit 126 turns off the switch 216 so that resistor 214 open to ground when no packet transmitting on cable 120 or cable 120 is disconnected to network interface apparatus 100. At this time, the electrical charge time constant ($\tau 2$) as shown in following:

$$\tau 2 \cong Ztx \cdot (Ctx + Cpad) \quad (2)$$

Due to resistor 214 and ground are open, it will make loading capacitance Cload uncharged. And the loading capacitance Cload will be viewed as zero. Accordingly, detector 204 can detect the electrical charge time constant ($\tau$) on metal line 212 getting short, which represents network interface apparatus 100 is operating on power saving mode or can operate on power saving mode. Meanwhile, power management circuit 110 can power down or disable all of circuits or part of circuits positioned in physical layer circuit 102, media access control 104 or interface circuit 106, or circuits relevant to network interface apparatus 100 positioned in chipset 112 so as to save power.

In addition to the aforementioned approach, there are many different ways to change electrical charge time constant ($\tau$). For example, changing the number of parallel resistors or the number of serial resistors, increasing or decreasing the capacitance in the load 210 and so forth. It is noticed that those of approaches can change electrical charge time constant ($\tau$) are belonging to the scope of present invention.

Figure 3:
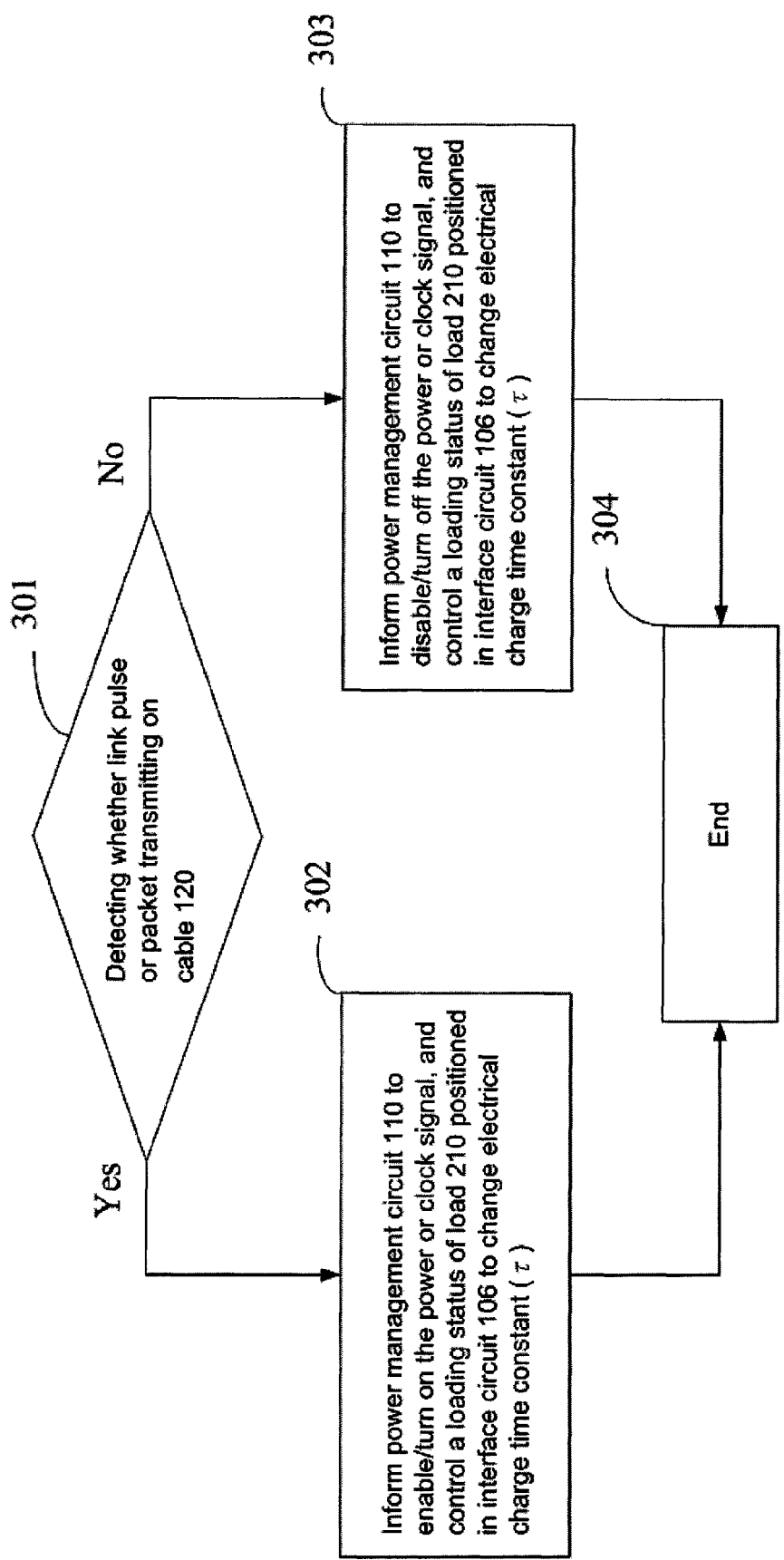
FIG. 3 shows a flow chat of power saving method of the network interface apparatus according to the present invention.

FIG. 3 is a flowchart illustrating the power saving method of network interface apparatus 100.

Step 301: detecting whether link pulse or packet transmitting on cable 120; if yes, go to step 302; if no, go to step 303.

Step 302: Inform power management circuit 110 to enable/turn on the power or clock signal, and control a loading of load 210 positioned in interface circuit 106 to change electrical charge time constant ($\tau$).

Step 303: Inform power management circuit 110 to disable/turn off the power or clock signal, and control a loading of load 210 positioned in interface circuit 106 to change electrical charge time constant ($\tau$).

Step 304: End

In Step 301, detecting whether link pulse or packet transmitting on cable 120 can be executed by detecting circuit 108 and accordingly transmitting a detecting result to power management circuit 110 and interface circuit 106 to determine whether network interface apparatus 100 will set into power saving mode or not. If detecting circuit 108 determines that network interface apparatus 100 does not set into power saving mode (Step 302), power management circuit 110 will enable/turn on the power or clock signal of network interface apparatus 100 so that packet can be transmitted on cable 120. Contrarily, if detecting circuit 108 determines that network interface apparatus 100 should set into power saving mode (Step 303), power management circuit 110 will disable/turn off the power or clock signal of physical layer circuit 102, media access control 104 or interface circuit 106 so as to save power.

The foregoing embodiment uses wired network interface apparatus 100 as an example. Actually, this invention can be applied in wireless application as well. For example, physical layer circuit 102 can be designed as a wireless physical layer circuit to receive radio signal. Detecting circuit 108 detects the beacon of transmitted packet to observe transmitting status so as to determine whether set wireless network interface apparatus 100 into power saving mode. Similar to wired network application, When detecting circuit 108 determines that wireless network interface apparatus 100 can operates on power saving mode, loading control circuit 126 will control the loading of load 210 positioned in interface circuit 126 to change electrical charge time constant ($\tau$). Other operations with wireless application are similar to wired application, and therefore are not discussed herein. In this regard, such related description is omitted here for the sake of brevity.

According to the foregoing description, it is understood that this invention provides an approach that changing the loading to change electrical charge time constant ($\tau$) so that when network interface apparatus 100 setting into power saving mode, without using extra pin to inform chipset 112 or BIOS 118. Thus, not only network interface apparatus 100 can reduce the pin count, but also chipset 112 or BIOS 118 can reduce the pin count.

The foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A network interface apparatus, comprising:
    a physical layer circuit, for receiving a packet on a network;
    a media access control circuit, for performing the media access processing for the packet to output a processed packet;
    an interface circuit, coupled to the media access control circuit, for transmitting the processed packet to a bus;
    a detecting circuit, coupled to the physical layer circuit, for detecting a transmitting status of the packet on the network to output a detecting signal; and
    a loading control circuit, coupled to the detecting circuit, for controlling a load positioned in the interface circuit according to the detecting signal.

2. The network interface apparatus of claim 1, wherein when the detecting unit detects no packet transmitted on the network, the loading control circuit controls the load to change an electrical charge time constant.

3. The network interface apparatus of claim 1, wherein when the detecting unit detects no packet transmitted on the network, the loading control circuit controls the load so that the load become an open status.

4. The network interface apparatus of claim 1, wherein the interface circuit comprises a receiver, and the load is coupled to an input of the receiver.

5. The network interface apparatus of claim 1, wherein the load comprises:
   a resistor, coupled to the bus;
   a switch, coupled between the resistor and a supply voltage;
   wherein the loading control circuit controls the switch so that changes a electrical charge time constant according to the detecting signal.

6. The network interface apparatus of claim 1, wherein the detecting unit detects a link pulse of the network to determine the transmitting status of the packet.

7. The network interface apparatus of claim 1, wherein the detecting unit detects a beacon of the network to determine the transmitting status of the packet.

8. The network interface apparatus of claim 1, further comprises:
   a power management circuit, coupled to the detecting unit, for controlling the power of the physical layer circuit, media access control circuit or the interface circuit according to the detecting signal.

9. The network interface apparatus of claim 1, further comprises:
   a power management circuit, coupled to the detecting unit, for controlling the clock signal of the physical layer circuit, media access control circuit or the interface circuit according to the detecting signal.

10. The network interface apparatus of claim 1, coupled to a chipset through the bus, the chipset periodically outputs a pulse signal to detect an operating mode of the network interface apparatus.

11. The network interface apparatus of claim 10, wherein the pulse signal outputted by the chipset is controlled by a basic input/output system.

12. The network interface apparatus of claim 1, wherein the bus is a PCI-E bus.

13. The network interface apparatus of claim 1, wherein the network is a wired network.

14. The network interface apparatus of claim 1, wherein the network is a wireless network.

15. A network signal processing method, comprising:
   receiving a packet from a network, in a physical layer circuit;
   performing media access processing on the packet to generate a processed packet, using a media access control circuit;
   transmitting the processed packet on a bus, using an interface circuit that is coupled to the media access control circuit;
   detecting the transmitting status of the packet on the network so as to generate a detecting signal, using a detecting circuit that is coupled to the physical layer circuit; and
   controlling a load positioned in an interface circuit according to the detecting signal, using a loading control circuit.

16. The network signal processing method of claim 15, further comprises:
   controlling the load to change an electrical charge time constant when no packet transmitting on the network.

* * * * *